2,827,449

PROCESS OF DIAZOTIZATION OF AROMATIC PRIMARY AMINES

Martin Luther Kesler, Middlesex, N. J., assignor to American Cyanamid Company, New York, N. Y., a corporation of Maine No Drawing. Application May 27, 1954
Serial No. 432,935

10 Claims. (Cl. 260—141)

This invention relates to an improved process of diazotizing aromatic primary amines.

The preparation of diazonium salts by treatment of aromatic primary amines with nitrous acid or sodium nitrite is well known. Hydrochloric acid is usually employed in diazotizations in aqueous solutions because it gives, in general, the most soluble salts with aromatic amines. The acid must be used in excess in order to prevent partial diazotization and condensation of the diazonium salt with the undiazotized amine to form the diazoamino compound.

If diazotization is to proceed satisfactorily, the amine must be in solution in the aqueous acid or the amine salt, usually as the hydrochloride, must be in a fine state of suspension. Amines such as benzidine, for example, are almost invariably used in the form of the hydrochloride, either as such or as formed in situ, because conventional diazotization of the hydrochloride in aqueous hydrochloric acid is much faster than that of the sulfate.

It is known, however, that benzidine sulfate can be obtained in a more pure form than benzidine hydrochloride because the sulfate is much more insoluble in water than is the hydrochloride. Also benzidine sulfate is less readily absorbed by the skin than is the hydrochloride and is, therefore, less hazardous to handle. It is also recognized that the use of hydrochloric acid in diazotization is more expensive than sulfuric acid and presents greater corrosion problems.

However, the fact that the benzidine hydrochloride tetrazotizes so much more rapidly than does the sulfate in conventional tetrazotization procedures has outweighed the advantages possessed by the sulfate with the result that the use of the sulfate in the preparation of azo dyes has been of relatively little practical importance in spit of the obvious benefits thereof.

In accordance with the present invention, I have discovered that it is possible to carry out the diazotization reaction in sulfuric acid with the sulfate of an aromatic primary amine, as, for example, benzidine, in a much improved manner whereby very rapid diazotization takes place. Essentially, the present invention involves the addition of chloride ion to an aqueous sulfuric acid solution of the amine. The nitrite is added to the slurry and the diazotization reaction proceeds in the ordinary way except that it is complete in a very short period of time. The time necessary for diazotization or tetrazotization in the case of aromatic diamino compounds is reduced to a fraction of that required to effect diazotization of the sulfate in the absence of chloride ion, and, in addition, compares favorably with the time necessary to complete the diazotization of the hydrochloride.

It is a surprising feature of the present invention that the addition of chloride ion to a sulfuric acid solution of the amine sulfate will speed up the diazotization reaction so remarkably since because the sulfate is more insoluble than the chloride, it would be expected that any double decomposition reaction would be predominantly in the direction of the sulfate and not in the direction of the chloride.

The addition of chloride ion is accomplished by the use of any suitable water-soluble chloride such as lithium chloride, sodium chloride, potassium chloride, rubidium chloride, cesium chloride, zinc chloride, barium chloride, strontium chloride, calcium chloride, aluminum chloride, and the like. It will be noted that many of these salts have cations forming insoluble sulfates. As a matter of practicality one would not normally choose such a salt. However, experimental evidence shows surprisingly that they do accelerate the diazotization reaction.

The amount of water-soluble chloride added to the mixture varies with the amount of acceleration of the reaction that is desired since the rate of diazotization of the sulfate appears to vary directly with the concentration of the chloride ion. In general, I have found that the metallic chloride salt may be added to the extent of between about 20% and 500% by weight of amine. The amount necessary to increase the diazotization rate varies somewhat, of course, with the particular amine employed. In actual operating practice, it is preferred that the metallic chloride salt be present to the extent of between about 100–150%. However, in actual practice, especially with benzidine sulfate, the usage is somewhat higher because it is desired to complete the diazotization reaction in as short a time as possible.

The present invention is not limited to the tetrazotization of benzidine sulfate, although this represents a preferred diazonium component. The diazotization method of the present invention is applicable to aromatic primary amines generally and may be usefully applied to the tetrazotization of derivatives of benzidine such as dianisidine, tolidine, and the like. Simple diazotizable benzene derivatives such as aniline, toluidine, halogen derivatives of aniline, such as o-chloraniline, p-chloraniline are also operable. Sulfonic acids of aromatic primary amines such as sulfanilic acid, the carboxylic acids of aniline such as anthranilic acid as well as mixed derivatives of aniline such as toluidine sulfonic acids and chloranthranilic acids may also be used as well as naphthylamine and derivatives such as alphanaphthylamine, beta-naphthylamine and naphthylamine sulfonic acids.

In carrying out the present invention, an aromatic primary amine is dissolved or slurried in aqueous sulfuric acid using from about 1½ to about 3½ moles of acid per amino group to be diazotized. This is ordinarily sufficient acid to form the sulfuric acid salt of the amine as well as to form the nitrous acid needed for the reaction from the sodium nitrite. A soluble chloride salt, as hereinbefore described, is added and the diazotization of the amine sulfate is carried out by the addition of a suitable nitrite such as sodium or ammonium nitrite.

It is an advantage of the present invention that even though in some cases there may be little need to use the sulfate of the amine, as for example, when there is little or no difference in purity between the amine hydrochloride and the amine sulfate, nevertheless the diazotization procedure of the present invention using sulfuric acid affords considerable advantage over the prior art procedures employing hydrochloric acid. Of considerable importance is the fact that for some reason, which I have not been able to determine, diazotizing the sulfate in the presence of chloride ion prevents partial diazotization and condensation of the diazonium salt with the undiazotized amine which forms the by-product diazoamino compound. This is an undesirable by-product reaction in the prior art procedures and heretofore could be prevented by the use of excess acid. With the use of chloride salts in the diazotization reaction of the present invention, however, the formation of the by-product diazoamino compound is effectively prevented by the use of a very cheap material which is not only an advantage from the standpoint of cost, but also the prevention of the formation of this undesirable by-product, which consumes some of the amine and which reduces the yield of the diazonium component and produces insoluble impurities which carry over into the dye, is thereby effectively prevented.

The temperature at which the diazotization or tetrazotization reaction of the present invention is carried out are those customarily employed in the art and which range from about —5° C. to about 30° C., depending upon the particular aromatic amine employed.

The invention will be described in greater detail in conjunction with the following specific examples:

Example 1

9.2 grams of benzidine as the sulfate were slurried in 100 cc. of water. 13.5 grams of sulfuric acid were added while the mixture was kept at 5–10° C. 45 grams of sodium chloride were added. 7.3 grams of sodium nitrite were then added as an aqueous solution, and the mixture stirred until tetrazotization was completed. The time for complete tetrazotization was 20 minutes.

The above experiment was repeated except that no sodium chloride was added. The time for complete tetrazotization was found to be 360 minutes.

Example 2

9.2 grams of benzidine as the sulfate were slurried in 100 cc. of water. 13.5 grams of sulfuric acid were added followed by various quantities of sodium chloride in separate experiments as set forth below. 6.9 grams of sodium nitrite was added to the mixture, and the mixture was stirred at 5–10° C. until the reaction was complete. The quantities of sodium chloride used and the tetrazotization times are set forth below.

| | Minutes |
|---|---|
| 9 grams of sodium chloride | 150 |
| 15 grams of sodium chloride | 120 |
| 30 grams of sodium chloride | 80 |
| 45 grams of sodium chloride | 20 |

Example 3

In separate tests 9.2 grams of benzidine as the sulfate were slurried in 100 cc. of water which was then acidified with 8.5 grams sulfuric acid. Various metal chlorides as set forth below were added followed by the several charges followed by the addition of sodium nitrite solution at 5–10° C. until tetrazotization was complete. The results obtained are set forth below:

| | Minutes |
|---|---|
| 15 grams of sodium chloride | 45 |
| 28 grams of calcium chloride | 10 |
| 34 grams of zinc chloride | 25 |
| 17 grams of aluminum chloride | 45 |

Example 4

9.2 grams of benzidine as the sulfate were slurried in 100 cc. of water. 8.5 grams of sulfuric acid were added followed by 15 grams of sodium chloride. The mixture was then stirred at 0–10° C. while 6.9 grams of sodium nitrite dissolved in water were added. The tetrazotization required 135 minutes.

The experiment was repeated except that 14 grams of ammonium chloride were substituted for the sodium chloride. Tetrazotization was complete in 135 minutes.

Example 5

49.7 grams of aniline were added to 300 cc. of water. The mixture was diluted to 530 cc. and 60 grams of sulfuric acid were added. 50 grams of sodium chloride were added, the mixture was cooled to 0° C. and 36.9 grams of sodium nitrite dissolved in water was added gradually. Diazotization was complete in 2 minutes.

The experiment was repeated except that the sodium chloride was omitted. Diazotization required 15 minutes.

Example 6

12.2 grams of dianisidine were slurried in 100 cc. of water. 12.3 grams of sulfuric acid were added and the mixture was cooled to 25° C. 20.0 grams of sodium chloride were added. 6.9 grams of sodium nitrite dissolved in water were added gradually and the mixture was stirred until tetrazotization was complete. The tetrazotization was complete in 10 minutes.

The experiment was repeated excepting that the sodium chloride was omitted. The time required for the tetrazotization was 45 minutes.

Example 7

34.6 grams of sulfanilic acid were added to 200 cc. of water and the mixture was stirred while adding 13.25 grams of sulfuric acid. The mixture was cooled to 5° C. and 50 grams of sodium chloride were added. The mixture was stirred at this temperature, and 13.8 grams of sodium nitrite as an aqueous 40% solution was added gradually. Diazotization was complete in 5 minutes with no change in the rate of reaction from start to finish.

The experiment was repeated excepting that the sodium chloride was omitted. Diazotization required 15 minutes and it was observed that the first one-third of the nitrite addition consumed a much larger proportion of the total time than was required when the sodium chloride was present.

Example 8

The amines listed below were diazotized by dissolving 0.1 mole of the amine in 200 cc. of water followed by the addition of 12.3 grams of sulfuric acid with heating if necessary to form a sulfate. 45 grams of sodium chloride were added to the reaction mixtures and the slurry of amine sulfate and sodium chloride was cooled to 0° C. by internal icing and held at 0–5° C. while an aqueous solution of 6.9 grams of sodium nitrite was added gradually. A comparable series of experiments were run with each of the amines except that no salt was added so as to serve as controls. The results of these experiments are reported below:

| Amine | Diazotization Times | |
|---|---|---|
| | Without Salt | With Salt |
| o-Chloraniline | 12 min | 2 min. |
| p-Chloraniline | 50 min | 2 min. |
| 4-Chloro-2-Anisidine | 5 min | 1 min. |
| 1-Naphthylamine | 2.5 hr | 43 min. |
| 4-Amino-2, 5-Dichlorobenzene sulfonic acid | 8 min | 4 min. |
| 4, 4'-Diamino-3, 3'-dimethyldiphenyl | 6–8 hr | 47 min. |
| Anthranilic acid | 4 min | 45 sec. |
| 1-Naphthylamine-5-sulfonic acid | 30–40 hr | 6.5 hr. |

It was observed from these experiments, particularly with the chloroanilines, 1-naphthylamine and 4,4'-diamino-3,3'-dimethyldiphenyl that when the salt was not present in the reaction mixture, an insoluble diazoamino by-product was formed and which was not formed when the salt was present.

I claim:

1. The method of diazotizing aromatic primary amines which comprises carrying out the diazotization reaction with an aqueous sulfuric acid solution of the amine in the presence of nitrous acid and in the presence of between about 20% and 500% of a water-soluble metallic chloride salt by weight of the amine to be diazotized.

2. The method according to claim 1 in which the amine is present in the form of its sulfate.

3. The method according to claim 1 in which the amine is benzidine.

4. The method according to claim 2 in which the amine sulfate is benzidine sulfate.

5. The method according to claim 1 in which the amine is aniline.

6. The method according to claim 5 in which the amine is aniline sulfate.

7. The method of tetrazotizing benzidine which comprises mixing benzidine sulfate with an aqueous solution of sulfuric acid, adding a water-soluble metallic chloride salt to the sulfuric acid solution of the benzidine sulfate, and tetrazotizing the benzidine sulfate in the presence of nitrous acid, the quantity of water-soluble metallic chloride salt being present to the extent of between about 20% and 500% by weight of the benzidine sulfate.

8. The method according to claim 7 in which the metallic chloride is sodium chloride.

9. In the method of diazotizing aromatic primary amines in an aqueous sulfuric acid solution with nitrous acid, the combination therewith of the step of carrying out the diazotization in the presence of 100 to 150% by weight of the amine of sodium chloride.

10. The method of claim 9 in which the amine is benzidine, utilized in the form of its sulfate.

References Cited in the file of this patent

UNITED STATES PATENTS

| | | |
|---|---|---|
| 380,098 | Diehl | Mar. 27, 1888 |
| 793,743 | Sandmeyer | July 4, 1905 |
| 1,572,715 | Gunther et al. | Feb. 9, 1926 |
| 1,585,145 | Harris et al. | May 18, 1926 |
| 1,846,113 | Johner | Feb. 23, 1932 |
| 2,013,180 | Koch | Sept. 3, 1935 |
| 2,650,238 | Danek et al. | Aug. 25, 1953 |

FOREIGN PATENTS

| | | |
|---|---|---|
| 10,323 | Great Britain | of 1906 |